United States Patent Office 3,548,009
Patented Dec. 15, 1970

3,548,009
ISOPROPYLIDENE DIPHENOL ETHER DERIVATIVES
Duane B. Priddy, Lansing, and Henry E. Hennis, Coleman, Mich., assignors to The Dow Chemical Company, Midland, Mich., a corporation of Delaware
No Drawing. Filed Jan. 3, 1969, Ser. No. 788,957
Int. Cl. C07c 43/20
U.S. Cl. 260—613
4 Claims

ABSTRACT OF THE DISCLOSURE

Componds corresponding to the formula

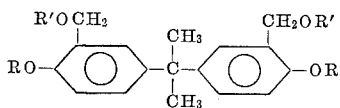

wherein R and R' individually represent a lower alkyl, a lower alkenyl or a benzyl group. The compounds are prepared by reacting a 2,2-bis(α-chloro-4-lower alkoxy-m-tolyl)propane with an alkali metal alcoholate of a lower alkanol, a lower alkenol or a benzyl alcohol having up to two lower alkyl substituent groups. The compounds are useful as antimicrobials.

SUMMARY OF THE INVENTION

The present invention concerns a group of new para,-para'-isopropylidenediphenol ether derivatives corresponding to the formula

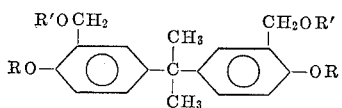

wherein R and R' individually represent a lower alkyl, a lower alkenyl or a benzyl group and wherein the benzyl group may contain from 0 to 2 lower alkyl substituent groups. In the specification and claims, the term "lower alkyl" refers to straight and branched chain alkyl groups containing from 1, to 2, to 3, to 4 carbon atoms, for example, methyl, ethyl, propyl, isopropyl and n-butyl, while the term "lower alkenyl" refers to alkenyl groups containing 3 to 4 carbon atoms such as 2-propenyl and 2- or 3-butenyl. The new compounds are oils which have a low solubility in water and a higher solubility in common organic solvents such as ethanol, acetone, benzene, toluene and xylene. The compounds are antimicrobials and microbicides and are particularly adapted to be used for the control of various fungal organisms.

The compounds are prepared by reacting a 2,2-bis-(α-chloro-4-alkoxy-, 4-alkenyloxy- or 4-benzyloxy-m-tolyl)propane, hereinafter referred to as the chloromethyl diphenol ether reactant, with an alkali metal alcoholate of a lower alkyl alcohol, a lower alkenyl alcohol or a benzyl alcohol according to the following equation

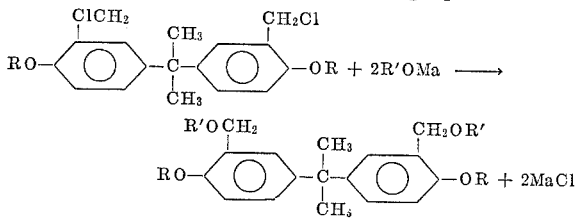

wherein Ma represents an alkali metal such as sodium, potassium or lithium. The reaction is conveniently carried out in the presence of R'OH, the alcohol corresponding to the alcoholate, or in the presence of an aliphatic or aromatic hydrocarbon such as hexane, naphtha, benzene or toluene as solvent reaction medium. The alcoholate conveniently may be formed in situ from the alcohol and alkali metal hydroxide or free alkali metal. In such case, water is conveniently used as the reaction medium. The amounts of the reactants to be employed are not critical, some of the product being formed when employing any proportions. The reaction consumes the reactants in the ratio of one mole of the chloromethyl diphenol ether reactant to two moles of the alkali metal alcoholate and the employment of such proportions is advantageous. However, superior yields are obtained when using from 200 to 1,000 percent or more of theoretical proportions of alkali metal alcoholate reactant. The upper limits of the amounts of excess alcoholate used are ordinarily determined by the economics of the process. The reaction proceeds at a temperature at which alkali metal chloride is liberated, conveniently at temperatures between 50° C. and reflux temperature. Pressure equipment can be used when it is desired to use temperatures higher than the normal atmospheric reflux temperature.

In carrying out the reaction, the chloromethyl diphenol ether and the alkali metal alcoholate reagent are contacted in any convenient fashion and maintained for a predetermined period of time in the reaction temperature range to complete the reaction. In a convenient procedure, the chloromethyl diphenol ether is added to a well-stirred solution in the solvent medium of the alkali metal alcoholate. During the addition of the chloromethyl diphenol ether to the reaction medium and for a period thereafter, the temperature of the reaction mixture is maintained within the reaction temperature range.

Upon completion of the reaction, the desired product is separated by conventional procedures. In a convenient operation, the reaction mixture is poured into water and the oily crude product which separates is extracted with an appropriate aliphatic or aromatic hydrocarbon solvent such as naphtha, benzene or toluene or a chlorinated hydrocarbon solvent such as methylene chloride or chlorobenzene. The solvent is then removed by distillation under reduced pressure to give purified product.

DESCRIPTION OF THE PREFERRED EMBODIMENTS

The following examples describe completely representative specific embodiments and the best modes contemplated by the inventors for carrying out their invention.

EXAMPLE 1

2,2-bis(4-ethoxy-α-methoxy-m-tolyl)propane 2,2-bis(α-chloro-4-ethoxy-m-tolyl)propane (50 g.; 0.13 mole), methyl alcohol (84 g.; 2.6 moles) and sodium hydroxide (12.4 g.; 0.31 mole) are heated at the reflux temperature for two hours and then poured into 200 ml. of water. The colorless oil which separates is extracted with toluene. The toluene is removed by distillation under reduced pressure to yield a colorless oil $n_D{}^{25}$ 1.5445, molecular weight 372.

*Analysis.*—Calc'd for $C_{23}H_{32}O_4$ (percent): C, 74.2; H, 8.60. Found (percent): C, 74.3; H, 8.56.

EXAMPLE 2

2,2-bis(4-(benzyloxy)-α-((o-butylbenzyl)oxy)-m-tolyl)propane

A cold mixture of 32.4 g. of o-butylbenzyl alcohol in 100 ml. of toluene is added to an ice cold solution of 10 g. of sodium hydroxide dissolved in 250 ml. of water. To this is added dropwise with stirring 40.8 g. of 2,2-bis(α-chloro-4-benzyloxy-m-tolyl)propane dissolved in 500 ml. of toluene. The reaction temperature is then raised to the boiling point and the reaction mixture is stirred and heated at reflux temperature for two hours. After cooling, the layers are separated. The toluene solution containing the reaction product is washed twice with water and the toluene is removed by distillation. The last traces of toluene are removed by distillation under reduced pressure (ca. 20 mm. Hg). The product so obtained is a viscous yellow oil which is found upon analysis to be consistent with the assigned structure.

Other representative compounds of the present invention, as set forth in following Table I, are prepared in accordance with the procedure described above using corresponding chloromethyl diphenol ethers and sodium or potassium alcoholates as starting materials. In Table I, the symbol "M.W." is used as an abbreviation of the term "molecular weight."

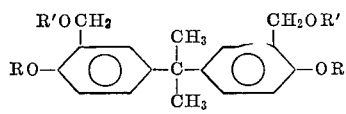

| R | R' | Characterizing properties— oil, M.W. |
|---|---|---|
| Methyl | Methyl | 344; $n_D^{25}$ 1.5579 |
| Ethyl | n-butyl | 457 |
| n-butyl | Ethyl | 457 |
| Allyl | Methyl | 397; $n_D^{25}$ 1.5555 |
| Allyl | Isopropyl | 453 |
| Isopropyl | Allyl | 453 |
| 2-butenyl | n-propyl | 481 |
| n-propyl | 2-butenyl | 481 |
| Benzyl | Ethyl | 525 |
| n-propyl | Benzyl | 553 |
| Allyl | Benzyl | 549 |
| 3-butenyl | Benzyl | 577 |
| o,p-dimethylbenzyl | o,p-dimethylbenzyl | 761 |
| p-butylbenzyl | p-butylbenzyl | 865 |

The new compounds are useful as antimicrobials and microbicides, particularly for the control of fungi such as *Venturia inaequalis* (applescab fungus), *Bremia lactucae* (downy mildew of lettuce) and *Piricularia oryzae* (rice blast). For such use, the unmodified compounds can be employed. Alternatively, the toxicant compounds can be dispersed on an inert finely-divided solid to prepare dust compositions. The dust compositions can be dispersed in water with or without the aid of a wetting or dispersing agent, the resulting aqueous dispersions being useful as sprays. In other procdures, the compounds can be employed as constituents in oil or solvent compositions, or with or without an emulsifying or dispersing agent in solvent-in-water or water-in-solvent emulsions or dispersions which are useful as sprays, drenches or washes.

The exact concentration of the toxic constituent to be employed in the treating composition is not critical and may be varied considerably provided an effective amount of the toxicant is supplied, whether on the plant or plant part or in the soil or other environment of the organism. Good results are obtained when employing compositions containing pesticidal or antimicrobial concentrations and usually from about 1,000 to 10,000 parts per million by weight of one or more of the compounds. This is not to suggest that the compounds herein claimed and compositions containing them are equally effective at similar concentrations or against the same microbes. The concentration of toxicant in liquid compositions generally is from about 1–50 percent by weight. Concentrations up to 95 weight percent often are conveniently employed. Thus, the concentration of the toxicant can be from about 1–10 weight percent. In compositions to be employed as concentrates, the toxicant can be present in a concentration of from 5–98 weight percent.

In representative operations, each of 2,2-bis(4-ethoxy-α-methoxy-m-tolyl)propane, 2,2 - bis(α,4 - dimethoxy-m-tolyl)propane and 2,2-bis(4-allyloxy-α-methoxy-m-tolyl)-propane is employed in an aqueous acetone composition at a concentration of 1,000 parts per million by weight, All of such compositions prevent the growth of downy mildew and give 90 percent control of the growth of applescab fungus. The last-named composition also gives 90 percent control of the growth of rice blast.

The, 2,2-bis((4-alkoxy-, alkenyloxy- or benzyloxy-3-(chloromethyl)penyl))propane starting materials are prepared by chloromethylating a 2,2-bis(4-alkoxy-, alkenyloxy- or benzyloxyphenyl)propane, i.e., a diether of para, para'-isopropylidene diphenol according to the following equation:

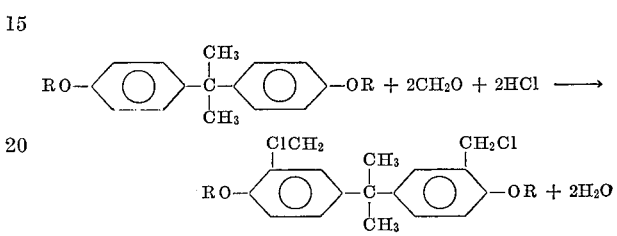

The reaction is conveniently carried out in the presence of acetic acid as a solvent reaction medium. The acetic acid also functions as a catalyst. Hydrogen chloride reactant is used, preferably as anhydrous gas, advantageously by saturating the acetic acid reaction medium therewith. The formaldehyde reactant also is advantageously dissolved in the reaction medium, conveniently as a low polymer such as trioxane or para-formaldehyde. The amounts of the reactants to be employed are not critical, some of the product being formed when employing any proportions. The reaction consumes the reactants in the ratio of one mole of the diphenol diether to two moles of each of the formaldehyde and hydrogen chloride chloromethylating reactants, and the employment of such proportions is advantageous. However, superior yields are obtained when using from 200 to 500 percent or more of theoretical proportions of formaldehyde and hydrogen chloride. The upper limits of the amounts of excess formaldehyde and hydrogen chloride used are ordinarily determined by the economics of the process. The reaction proceeds at a temperature at which water of reaction is liberated, conveniently at temperatures between 0° C. and reflux temperature. Pressure equipment can be used when it is desired to use temperatures higher than the normal atmospheric reflux temperature.

In carrying out the reaction, the diphenol diether and the chloromethylating reagents are contacted in any convenient fashion and maintained for a predetermined period of time in the reaction temperature range to complete the reaction. In a convenient procedure, the diphenol diether is added to a well-stirred solution of formaldehyde polymer and anhydrous hydrogen chloride in acetic acid, the solvent medium conveniently first having been saturated with anhydrous hydrogen chloride. During the addition of the diphenol diether to the chloromethylating reaction medium and for a period thereafter, the temperature of the reaction mixture is maintained within the reaction temperature range.

Upon completion of the reaction, the desired product is separated by conventional procedures. In a convenient operation, the reaction mixture is poured into water and the oily crude product which separates is washed with aqueous base, for example, aqueous 10 percent sodium hydroxide, potassium hydroxide, sodium carbonate or potassium carbonate. The so-washed oily product may usually be crystallized from a suitable solvent, e.g., aqueous ethanol, isopropanol or n-butanol and dried to give purified product.

What is claimed is:
1. The compound corresponding to the formula

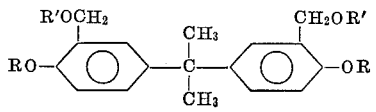

wherein R and R' individually represent a 1 to 4 carbon lower alkyl, a 3 to 4 carbon lower alkenyl or a benzyl group having from 0 to 2 lower alkyl substituent groups.

2. The compound as claimed in claim 1 wherein R and R' each represents a methyl group.

3. The compound as claimed in claim 1 wherein R represents an ethyl group and R' represents a methyl group.

4. The compound as claimed in claim 1 wherein R represents an allyl group and R' represents a methyl group.

References Cited
UNITED STATES PATENTS
| | | | |
|---|---|---|---|
| 2,884,462 | 4/1959 | Henry | 260—613 |
| 3,060,243 | 10/1962 | Ham | 260—613 |

FOREIGN PATENTS
| | | | |
|---|---|---|---|
| 617,109 | 10/1962 | Belgium | 260—613 |

BERNARD HELFIN, Primary Examiner

U.S. Cl. X.R.

260—999; 424—341